US005652323A

United States Patent [19]

Papalos et al.

[11] Patent Number: 5,652,323
[45] Date of Patent: Jul. 29, 1997

[54] SELF-DISPERSING CURABLE EPOXY RESINS, DISPERSIONS MADE THEREWITH, AND COATING COMPOSITIONS MADE THEREFROM

[75] Inventors: John G. Papalos, Ledgewood, N.J.; Reuben H. Grinstein, Blue Bell, Pa.; Shailesh Shah, Dresher, Pa.; Joseph L. Mulvey, Lansdale, Pa.; Brian G. Jewell, North Wales, Pa.

[73] Assignee: Henkel Corporation, Plymouth Meeting, Pa.

[21] Appl. No.: 470,391

[22] Filed: Jun. 6, 1995

Related U.S. Application Data

[60] Division of Ser. No. 255,732, Jun. 14, 1994, Pat. No. 5,565,505, which is a continuation-in-part of Ser. No. 86,288, Jun. 30, 1993, abandoned.

[51] Int. Cl.[6] ............................................. C08G 59/64
[52] U.S. Cl. ................................................. 528/111
[58] Field of Search .................................... 528/111

[56] References Cited

U.S. PATENT DOCUMENTS

| | | | |
|---|---|---|---|
| 2,651,589 | 9/1953 | Shokal et al. | 154/140 |
| 2,705,223 | 3/1955 | Renfrew et al. | 260/18 |
| 2,811,495 | 10/1957 | Wittcoff et al. | 260/18 |
| 2,864,775 | 12/1958 | Newey | 260/2 |
| 2,899,397 | 8/1959 | Aelony et al. | 260/18 |
| 3,249,412 | 5/1966 | Kolek et al. | 65/3 |
| 3,301,804 | 1/1967 | Zors et al. | 260/29.2 |
| 3,366,600 | 1/1968 | Haberliin et al. | 260/47 |
| 3,515,698 | 6/1970 | Mauz et al. | 260/75 |
| 3,538,184 | 11/1970 | Heer | 260/830 |
| 3,547,881 | 12/1970 | Mueller et al. | 260/47 |
| 3,634,348 | 1/1972 | Carter et al. | 260/18 |
| 3,639,344 | 2/1972 | Kinnemah et al. | 260/47 |
| 3,931,109 | 1/1976 | Martin | 260/47 |
| 4,031,050 | 6/1977 | Jerabek | 260/29.2 |
| 4,033,917 | 7/1977 | Sekmakas et al. | 260/29.2 |
| 4,093,594 | 6/1978 | Anderson | 260/47 |
| 4,105,634 | 8/1978 | Hanson et al. | 526/65 |
| 4,113,684 | 9/1978 | Petrie | 260/29.2 |
| 4,116,900 | 9/1978 | Belanger et al. | 260/18 |
| 4,134,864 | 1/1979 | Belanger | 260/18 |
| 4,137,140 | 1/1979 | Belanger | 204/18 |
| 4,139,510 | 2/1979 | Anderson | 260/18 |
| 4,177,177 | 12/1979 | Vanderhoff et al. | 260/29.2 |
| 4,182,831 | 1/1980 | Hicks | 528/103 |
| 4,246,148 | 1/1981 | Shimp et al. | 260/18 |
| 4,315,044 | 2/1982 | Elmore et al. | 427/386 |
| 4,420,574 | 12/1983 | Moriarity et al. | 523/404 |
| 4,420,606 | 12/1983 | Waddill | 528/111 |
| 4,423,166 | 12/1983 | Moriarity et al. | 523/414 |
| 4,423,170 | 12/1983 | Waddill | 523/417 |
| 4,430,261 | 2/1984 | Schäfer et al. | 260/404.8 |
| 4,533,254 | 8/1985 | Cook et al. | 366/176 |
| 4,608,405 | 8/1986 | DeGooyer | 523/404 |
| 4,608,406 | 8/1986 | Williams et al. | 523/424 |
| 4,678,712 | 7/1987 | Elliott | 428/418 |
| 4,728,384 | 3/1988 | Goel | 156/307.3 |
| 4,738,995 | 4/1988 | Kooijmans et al. | 523/404 |
| 4,810,535 | 3/1989 | McCollum et al. | 427/410 |
| 4,824,927 | 4/1989 | Dobbelstein et al. | 528/88 |
| 4,835,225 | 5/1989 | Massingll, Jr. et al. | 525/481 |
| 4,883,830 | 11/1989 | Kitabatake et al. | 523/414 |
| 4,886,867 | 12/1989 | Lin et al. | 528/111 |
| 4,937,275 | 6/1990 | Kooijams et al. | 523/404 |
| 4,992,516 | 2/1991 | Schipfer et al. | 525/526 |
| 5,026,743 | 6/1991 | Beresford et al. | 523/404 |
| 5,032,629 | 7/1991 | Hansen et al. | 523/414 |
| 5,034,434 | 7/1991 | Beresford et al. | 523/404 |
| 5,057,557 | 10/1991 | Treybig et al. | 523/404 |
| 5,059,293 | 10/1991 | Sugishima et al. | 204/181 |
| 5,221,700 | 6/1993 | Gilbert et al. | 523/404 |
| 5,246,984 | 9/1993 | Darwen et al. | 523/404 |

OTHER PUBLICATIONS

"Water–Reducible Coatings via Epoxy Resin Modification with Jeffamine (Reg. TM) ED–2001 and Jeffamine (Reg TM) M–1000".

Technical Literature of Synthron Inc., Morgantown, North Carolina.

"Jeffamine® Polyoxypropyleneamine Curing Agents for Epoxy Resins", Texaco Chemical Company.

"Advanced Amine Technology for Superior Polymers", Texaco Chemical Company, 1992.

H. Lee and K. Neville, "Epoxy Polymers," *Encyclopedia of Polymer Science and Technology*, vol. 6, pp. 209–271, John Wiley and Sons, Inc., 1967.

*Encyclopedia of Polymer Science and Engineering*, John Wiley and Sons, New York, NY, vol. 6, pp. 340–361.

W.C. Griffith, "Emulsions", *Encyclopedia of Chemical Technology*, vol. 8, pp. 900–930, John Wiley and Sons, New York, NY, 1979.

Wicks, Z.W., Jr., Jones, F.N., Pappas, S.P., *Organic Coatings: Science and Technology*, vol. II, Application Properties and Performance, John Wiley & Sons, Inc., NY, 1994, pp. 42–45.

E. Hafslund, "Distillation", *Encyclopedia of Chemical Technology*, vol. 7, pp. 849–891, John Wiley and Sons, New York, NY 1979.

F. Standiford, "Evaporation", *Encyclopedia of Chemical Technology*, vol. 9, pp. 472–493, John Wiley and Sons, New York, NY, 1980.

*Primary Examiner*—Melvyn I. Marquis
*Assistant Examiner*—D. Aylward
*Attorney, Agent, or Firm*—Wayne C. Jaeschke; John Daniel Wood; Daniel S. Ortiz

[57] ABSTRACT

A self-dispersing curable epoxy composition is prepared upon contacting (a) 1.0 reactive equivalents of an epoxy resin, (b) from about 0.01 to 1.0 reactive equivalents of a polyhydric phenol, and (c) between 0.005 and 0.025 reactive equivalents of an amine-epoxy adduct, wherein the amine-epoxy adduct is formed upon contacting 1.0 equivalents of an aliphatic polyepoxide and between 0.3 and 0.9 reactive equivalents of a polyoxyalkyleneamine. The self-dispersing curable epoxy resin forms an aqueous dispersion upon mixing with water. When cured, the dispersion is useful as a coating composition.

13 Claims, No Drawings

5,652,323

1

SELF-DISPERSING CURABLE EPOXY RESINS, DISPERSIONS MADE THEREWITH, AND COATING COMPOSITIONS MADE THEREFROM

CROSS-REFERENCE TO RELATED APPLICATIONS

This application is a division of Ser. No. 08/255732, Jun. 14, 1994, U.S. Pat. No. 5,565,505 which is a continuation-in-part of U.S. Ser. No. 08/086,288, filed Jun. 30, 1993, abandoned, the disclosure of which is incorporated by reference herein.

FIELD OF THE INVENTION

The present invention relates to coating compositions made from aqueous epoxy dispersions. More specifically, this invention relates to self-dispersing curable epoxy resins, and to aqueous dispersions and coating compositions comprising the same.

BACKGROUND OF THE INVENTION

Epoxy resins have come into widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

One class of aqueous epoxy dispersions employs one or more additives, also known as dispersants or emulsifiers or surfactants, which are necessary to stabilize the epoxy resin in the dispersion or emulsion form. Representative examples include an aqueous epoxy dispersion as described in U.S. Pat. No. 3,301,804 (employing the reaction product of a boric acid ester derived from boric acid with both an alkylene glycol and a beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a non-ionic emulsifying agent), and Specialty Chemicals Bulletin SC-021 titled "Water-Reducible Coatings via Epoxy Resin Modification with Jeffamine (Reg. TM) ED-2001 and Jeffamine (Reg. TM) M-1000" available from Texaco Chemical Company, Bellaire, Tex. Another example comes from the technical literature of Synthron Inc., Morgantown, N.C., which discloses the use of PROX-E-141, a diglycidyl ether of Pluronic (Reg. TM) F88 diol (an ethylene oxide—propylene oxide—ethylene oxide block copolymer available from BASF Performance Chemicals, Parsippany, N.J.) as a reactive dispersant for epoxy resins. PROX-E-141 can act as a dispersant for epoxy resin in water, but then will react along with the epoxy resin when exposed to an amine functional curing agent.

The use of an additive to provide stability to an aqueous epoxy dispersion is preferably avoided as such additives add additional cost, formulation complexity, and may potentially interfere with the performance of a coating derived from the aqueous epoxy dispersion.

It is known to prepare aqueous epoxy dispersions from self-emulsifying epoxy resins. For example, U.S. Pat. No. 4,315,044 describes a stable epoxy dispersion composition

2 comprising (1) an aqueous medium; and (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the molecular weight of the epoxy resin is in the range between about 500–20,000. The dispersion can also contain 1–25 weight percent based on resin solids of a water-immiscible $C_8$–$C_{20}$ aliphatic monoepoxide reactive diluent.

U.S. Pat. No. 4,608,406 describes stable aqueous epoxy resin dispersions comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenol-formaldehyde novolac resin wherein the molecular weight of the epoxy resin is in the range of about 1000 to about 20,000. The stable dispersions can be modified by the addition of about 1 to about 25 weight percent of an aliphatic monoepoxide reactive diluent.

In an attempt to improve freeze-thaw stability, the stable aqueous epoxy resin dispersions can be modified by the addition of about 5–20 weight percent, based on resin solids weight, of a water-miscible solvent which, preferably, is a 2 to 8 carbon glycol or glycol ether.

There remains a need for further improvements in terms of the freeze-thaw resistance of aqueous epoxy resin dispersions, and in terms of the corrosion resistance and chemical resistance of coatings derived from aqueous epoxy resin dispersions which are adapted for application as industrial maintenance coating systems.

Accordingly, it is a primary object of this invention to provide a self-dispersing curable epoxy resin which may be dispersed in water without the necessity for an additive to stabilize the epoxy dispersion.

Another object of this invention is to provide aqueous dispersions of self-dispersing curable epoxy resins which exhibit long term stability under ambient storage conditions.

Yet another object of this invention is to provide coating compositions incorporating a self-dispersing curable epoxy resin, where the coating composition exhibits excellent properties when cured.

Other objects and advantages of the present invention shall become apparent from the accompanying description and examples.

SUMMARY OF THE INVENTION

It has been found that a self-dispersing curable epoxy composition can be prepared upon contacting (a) 1.0 reactive equivalents of an epoxy resin, (b) from about 0.01 to 1.0 reactive equivalents of a polyhydric phenol, and (c) from about 0.005 to 0.5 reactive equivalents of an amine-epoxy adduct, wherein the amine-epoxy adduct is formed upon contacting 1.0 equivalents of an aliphatic polyepoxide and from about 0.3 and 0.9 reactive equivalents of a polyoxyalkyleneamine.

The self-dispersing curable epoxy resin of the invention forms an aqueous dispersion upon mixing with water. When cured, films of the self-dispersing curable epoxy resin are useful as a coating composition.

DETAILED DESCRIPTION OF THE INVENTION

The self-dispersing curable epoxy resin formulation of the invention is prepared upon contacting (a) 1.0 reactive equivalents of an epoxy resin, (b) from about 0.01 to 1.0 reactive equivalents, preferably from about 0.4 to 0.6 reactive equivalents of a polyhydric phenol, and (c) from about 0.005 to 0.5 reactive equivalents (typically from about 0.005 to 0.05 reactive equivalents, more typically from about 0.005 to 0.025 reactive equivalents, and preferably from about 0.005 to 0.015 reactive equivalents) of an amine-epoxy adduct, wherein the amine-epoxy adduct is formed upon contacting 1.0 equivalents of an aliphatic polyepoxide and from about 0.3 to 0.9 reactive equivalents, preferably from about 0.6 and 0.8 reactive equivalents of a polyoxyalkyleneamine.

The Polyoxyalkyleneamine

The polyoxyalkyleneamine reactant comprises one or more amino-compounds where the amino-compound comprises both an amine group and a substantially water-soluble polyether chain. The polyoxyalkyleneamine reactant is soluble or at least partially soluble in water. Techniques to prepare suitable polyoxyalkyleneamine reactants are known in the art, and include reacting a hydroxyl group containing initiator with ethylene oxide and/or propylene oxide, followed by conversion of the resulting terminal hydroxyl group(s) to amine(s). Illustrative of the polyoxyalkyleneamine reactants employed in the invention are the Jeffamine (Reg. TM) brand of polyoxyalkyleneamines available from Texaco Chemical Company, Bellaire, Tex.

The polyoxyalkyleneamines of this invention have the structural formula

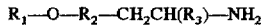

$$R_1-O-R_2-CH_2CH(R_3)-NH_2$$

wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

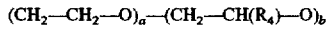

$$(CH_2-CH_2-O)_a-(CH_2-CH(R_4)-O)_b$$

wherein $R_4$ is a monovalent organic radical selected from the group consisting of $C_1$ to $C_4$ aliphatic hydrocarbons, 'a' designates a number of ethoxy groups ($CH_2-CH_2-O$),
'b' designates a number of monosubstituted ethoxy groups ($CH_2-CH(R_4)-O$) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

Preferred polyoxyalkyleneamines have $R_1$, $R_3$ and $R_4$ each equal to methyl, and either (i) a ratio of 'a' and 'b' of about 4:1, wherein the ethoxy and iso-propoxy groups are arranged in random blocks and the molecular weight of the polyoxyalkyleneamine is less than about 4,000, or (ii) a block of 5 ethoxy groups joined to a random sequence of ethoxy and iso-propoxy groups wherein the ratio of 'a' and 'b' in the random sequence is about 7:3 and the molecular weight of the polyoxyalkyleneamine is less than about 4,000, or (iii) a ratio of 'a' and 'b' of about 95:5, wherein the ethoxy and iso-propoxy groups are arranged substantially in two blocks and the molecular weight of the polyoxyalkyleneamine is less than about 6,000, or (iv) a ratio of 'a' and 'b' of about 7:3, wherein the ethoxy and iso-propoxy groups are present in random sequence and the molecular weight of the polyoxyalkyleneamine is less than about 4,000, or (v) a ratio of 'a' and 'b' of about 4:1, wherein the ethoxy and iso-propoxy groups are present in random sequence and the molecular weight of the polyoxyalkyleneamine is less than about 4,000.

The most preferred polyoxyalkyleneamine is Jeffamine (Reg. TM) M-2070 from Texaco Chemical Company, Bellaire Tex. According to Texaco, this polyoxyalkyleneamine is prepared by reacting methanol with ethylene oxide and propylene oxide followed by conversion of the resulting terminal hydroxyl group to an amine. The most preferred polyoxyalkyleneamine has an approximate molecular weight of 2,000 and a mole ratio of propylene oxide to ethylene oxide of 10/32.

The Aliphatic Polyepoxide

The aliphatic polyepoxide reactant comprises one or more compounds each having a plurality of epoxide functional groups. The aliphatic polyepoxide reactant has at least 2 epoxide groups present in the molecule, and may have as many as 6 epoxide groups present in the molecule. Techniques to prepare suitable polyepoxide compounds are known in the art, and include reacting compounds having a plurality of hydroxyl groups with epichlorohydrin in the presence of a suitable catalyst. Suitable aliphatic polyepoxide compounds are commercially available from Henkel Corporation, Ambler, Pa. under the trademarks "Capcures Reg. TM" or "Photomers Reg. TM"

One representative class of aliphatic polyepoxide reactant according to the invention has the structural formula:

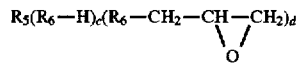

$$R_5(R_6-H)_c(R_6-CH_2-\underset{O}{\underset{\diagdown\diagup}{CH-CH_2}})_d$$

wherein $R_5$ designates a linear, branched or cyclic aliphatic or alicyclic organic radical having a valency equal to the sum of 'c' and 'd', where the sum of 'c' and 'd' is equal to or greater than 2 but no more than or equal to 6 and where 'd' is equal to or greater than 2 but less than or equal to 6. When the sum of 'c' and 'd' equals two (2), $R_5$ designates a linear, branched or cyclic aliphatic or alicyclic divalent organic radical having from 2 to 14 carbon atoms, and specifically includes the hydrocarbon portions of the dihydric alcohols ethylene glycol, butylene glycol, hexylene glycol, decanediol and dodecanediol which remain after the hydroxyl groups have been removed, and when the sum of 'c' and 'd' equals three (3), $R_5$ designates a linear, branched or cyclic aliphatic or alicyclic trivalent organic radical having from 3 to 14 carbon atoms, and specifically includes the hydrocarbon portions of the trihydric alcohols glycerol, 1,1,1-tris(hydroxymethyl)ethane, and 2-ethyl-2-(hydroxymethyl)-1,3-propanediol which remain after the hydroxyl groups have been removed, and when the sum of 'c' and 'd' equals four (4), $R_5$ designates a linear, branched or cyclic aliphatic or alicyclic tetravalent organic radical having from 5 to 30 carbon atoms, and specifically includes the hydrocarbon portion of the tetrahydric alcohol pentaerythritol which remains after the hydroxyl groups have been removed, and when the sum of 'c' and 'd' equals five (5), $R_5$ designates a linear, branched or cyclic aliphatic or alicyclic pentavalent organic radical having from 6 to 30 carbon atoms, and when the sum of 'c' and 'd' equals six (6), $R_5$ designates a linear, branched or cyclic aliphatic or alicyclic hexavalent organic radical having from 8 to 30 carbon atoms, and specifically includes the hydrocarbon portion of the hexahydric alcohol dipentaerythritol which remains after the hydroxyl groups have been removed, and $R_6$ represents a divalent polyoxyalkylene chain having the structural formula:

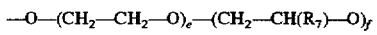

wherein $R_7$ is a monovalent organic radical selected from the group consisting of $C_1$ to $C_4$ aliphatic hydrocarbons, 'e' designates a number of ethoxy groups ($CH_2$—$CH_2$—O),
'f' designates a number of monosubstituted ethoxy groups ($CH_2$—$CH(R_7)$—O) where the substitution of one monosubstituted ethoxy group is independent from the substitution of any other monosubstituted ethoxy group in the polyoxyalkylene chain, the sum of 'e' and 'f' is equal to or greater than 0 but less than or equal to 10, and where the sequence of ethoxy and monosubstituted ethoxy groups within a polyoxyalkylene chain may be completely random and/or there may be blocks of ethoxy and/or monosubstituted ethoxy groups.

The most preferred aliphatic polyepoxide compound is the reaction product of pentaerythritol, propylene oxide and epichlorohydrin, having an epoxide equivalent weight (EEW) of about 230.

The Epoxy Resin

The epoxy resin used in the practice of this invention comprises one or more polyglycidyl ethers of polyhydric phenols having two (2) or more epoxide groups and one (1) or more six-carbon aromatized rings present in the molecule, as represented by the structural formula:

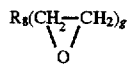

wherein $R_8$ represents a 'g' valent $C_6$–$C_{50}$ organic radical comprising at least one six-carbon aromatized ring (e.g. when g is 2, $R_8$ can be —$CH_2$—O—∅—$C(CH_3)_2$—∅—O—$CH_2$— or $R_8$ can be —$CH_2$—O—∅—$CH_2$—∅—O—$CH_2$— wherein ∅ represents a phenyl group), and 'g' is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. TM) epoxy resins from Shell Chemical Company, Houston, Tex., and DER (Reg. TM) or DEN (Reg. TM) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$-$C_{18}$ (preferably $C_1$-$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The Polyhydric Phenol

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula:

wherein $R_9$ represents an 'h' valent $C_6$-$C_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland, Mich., and Shell Chemical Company, Houston, Tex.

Illustrative of suitable polyhydric phenols are 2,2-bis(4-hydroxyphenyl)propane, 2,2-bis(3-bromo-4-hydroxyphenyl)propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

The Amine-Epoxy Adduct

The preparation of the self-dispersing curable epoxy resins of the invention may proceed through an amine-epoxy adduct, where the amine-epoxy adduct is subsequently reacted with a polyhydric phenol and an epoxy resin. The structure of the amine-epoxy adduct is dependant on the structures of the polyoxyalkyleneamine and the aliphatic polyepoxide used in the preparation of the amine-epoxy adduct, as well as the relative ratio of the reactants.

A representative amine-epoxy adduct has the structural formula:

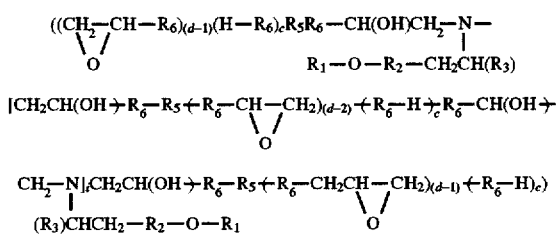

wherein

'i' indicates a number of repetitive units where 'i' is equal to or greater than zero (0) but less than or equal to about fifty.

The Self-Dispersing Curable Epoxy Resin

The self-dispersing curable epoxy resins of the invention may be prepared by reacting an amine-epoxy adduct with a polyhydric phenol and an epoxy resin. The structure and composition of the self-dispersing curable epoxy resin will depend on the identity of the amine-epoxy adduct, the identity of the epoxy resin, the identity of the polyhydric phenol and the relative ratio of the reactants.

The products of the above reaction are envisioned to be an extremely complex mixture of polymeric materials comprising two distinct groups. A simplified structure for each group of reaction products can be shown if it is assumed that the phenolic component is dihydric and the epoxy component is a diepoxide.

Structure [I]

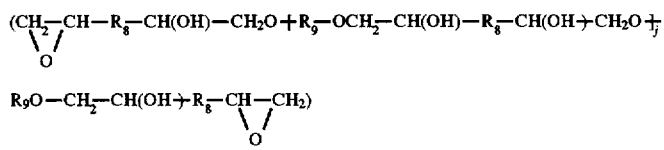

wherein

'j' indicates a number of repeating units, and is equal to or greater than zero (0) but less than or equal to twenty (20).

Structure [II]

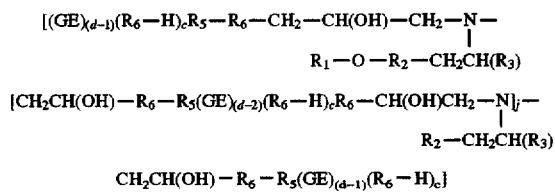

wherein 'GE' is defined as

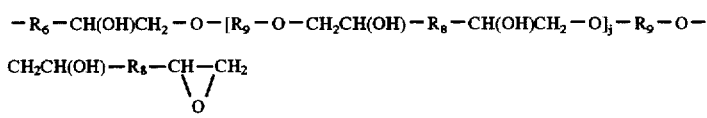

and all other variables are as defined above.

Organic Cosolvents

The self-dispersing curable epoxy resin of the present invention may be combined with a non-reactive, water-miscible, organic cosolvent. The cosolvent serves to reduce the viscosity of the self-dispersing curable epoxy resin. Preferred organic cosolvents include the alkyl ethers of monohydric and dihydric alcohols, where the alkyl group comprises $C_1$–$C_8$ linear or branched aliphatic or alicyclic chains. The choice of cosolvent can affect the pot-life of the self-dispersing curable epoxy resin. For example, for a given resin it may be possible to increase the pot-life by substituting for a cosolvent such as Ektasolve EP (Eastman Chemicals) with one of the following cosolvents (the greater increase being obtained in order): 1-methoxy-2-propyl acetate, methyl n-amyl ketone, or dipropylene glycol n-butyl ether.

Reactive Diluents

The preferred stable aqueous epoxy resin dispersions of the present invention are those which contain a water-immiscible $C_8$–$C_{20}$ aliphatic monoepoxide reactive diluent. The said monoepoxide component can contain alicyclic and aromatic structures, as well as halogen, sulfur, phosphorus, and other such heteroatoms. Suitable reactive diluents are available from CVC Specialty Chemicals, Inc., Cherry Hill, N.J.

Illustrative of monoepoxide reactive diluents are epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_8$–$C_{10}$ aliphatic alcohols.

The presence of a water-immiscible $C_8$–$C_{20}$ aliphatic monoepoxide reactive diluent in an aqueous epoxy resin dispersion has significant beneficial effects in addition to modifying the viscosity of the dispersion. For example, the said water-immiscible reactive diluent appears to coat the particles of epoxy resin solids and thereby provide the aqueous dispersion with improved shear, freeze-thaw resistance, shelf viscosity stability, and paint gloss.

Also, since the reactive diluent is epoxy functional, it becomes chemically bonded into the film which is formed during the subsequent room temperature curing of the aqueous dispersion composition after it has been blended with a curing agent and coated on a surface. The total quantity of reactive diluent contributes to the calculated proportion of non-volatiles in the dispersion composition.

Preparation of the Self-Dispersing Curable Epoxy Resin

In preparing the self-dispersing curable epoxy resins of this invention, an amine-epoxy adduct is first prepared by combining the polyoxyalkyleneamine reactant and the aliphatic polyepoxide reactant, heating the mixture slowly to about 130° C., holding the mixture at temperature for about 2.5 hours, and then discharging the amine-epoxy adduct from the reactor. The self-dispersing epoxy resin is prepared by combining the amine-epoxy adduct, the polyhydric phenol and the epoxy resin, and heating the mixture in the presence of a catalyst, e.g., potassium hydroxide, triphenyl phosphine, benzyl dimethylamine and the like, to a temperature of about 150° C. with stirring. An exothermic reaction will then occur, and cooling is applied to maintain the reaction temperature at about 150°–160° C. The mixture is maintained at about 160° C. for about one hour subsequent to the conclusion of the exothermic reaction, followed by heating to 190° C. The reaction is maintained at 190° C. for about 15 minutes in order to drive the reaction to completion, then cooled to about 160° C. whereupon a small amount of a water-soluble organic solvent is added prior to cooling and discharging the self-dispersing curable epoxy resin from the reactor.

Preparation of an Aqueous Dispersion of the Self-Dispersing Curable Epoxy Resin

The aqueous epoxy dispersion of the invention is prepared by charging the self-dispersing curable epoxy resin to a reaction vessel, then heating the resin to about 50°–100° C. with stirring. Water is gradually added to the self-dispersing curable epoxy resin while the temperature is allowed to drop to about 50° C. During this period, the water in oil dispersion is formed and then inverts to an oil in water dispersion. After inversion, additional water may be added as well as reactive diluent in the form of a $C_8$–$C_{10}$ alcohol mono-glycidyl ether.

The particle size of the oil phase in the aqueous dispersion can be modified by physical techniques to reduce the particle size. The particle size reduction is preferably accomplished by subjecting an aqueous dispersion of the precipitate to high shear, e.g. in a homogenizer such as that disclosed in U.S. Pat. No. 4,533,254 (Cook et al.), the disclosure of which is incorporated herein be reference, and commercially available as MICROFLUIDIZER™ from Microfluidics Corporation, Newton, Mass. Homogenizers are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference.

The aqueous dispersion of self-dispersing resin will typically exhibit excellent chemical and physical stability over an extended shelf-life, e.g. of from five to six months. As an example of the chemical stability, the epoxide equivalent weight (EEW) of the aqueous dispersion of self-dispersing resin should remain essentially constant, e.g. should show no trend of increasing molecular weight, over a period of at least one month from the preparation of the aqueous dispersion.

Epoxide equivalent weight can be determined by differential titration with perchloric acid using crystal violet as an indicator (e.g. a first sample is titrated with 0.1N perchloric acid to an endpoint that shows the first sight of green color form the crystal violet indicator, the amine equivalent weight of the dispersion is calculated from this titration, a second sample is mixed with excess tetraethylammonium bromide and titrated with 0.1N perchloric acid to a green endpoint that persists for at least 30 seconds, total epoxide and amine equivalents are calculated from this titration, and the epoxide equivalent weight is calculated as the difference).

As an example of physical stability, the resin should not display layer formation for a period of at least one month from the preparation of the aqueous dispersion, i.e. there should be no formation of a macro-observable water phase as a layer separate from the dispersed resin phase.

Coating Compositions Comprising an Aqueous Dispersion of the Self-Dispersing Curing Epoxy Resin The coating composition of the invention is prepared by combining the aqueous epoxy dispersion with a suitable hardening agent. The coatings are tack free after 45 minutes and have excellent film properties. An aqueous epoxy resin paint composition of the present invention may further contain additives conventionally employed in coating technology, such as organic pigments, inorganic pigments, surfactants, thickeners, and the like.

A room temperature curable water-borne coating composition is prepared by admixing a stable epoxy dispersion composition as described above with an epoxy-interacting curing vehicle, such as a polyamine curing agent. The ratio of active amino hydrogens to epoxy groups in the admixture is in the range of from 0.5:1 to 2:1 and, preferably, is in the range between about 0.8:1 to 1.5:1. For purposes of industrial maintenance paint compositions, the amino hydrogens must be sufficiently reactive to effect crosslinking interaction with the epoxy groups at ambient temperatures.

Suitable polyamine curing agents are those which are soluble or dispersible in water and which contain more than 2 active hydrogen atoms per molecule. Examples of such curing agents are alkylene polyamines represented by the formula:

$$H_2N\text{—}T\text{—}(NH\text{—}T)_u NH_2$$

wherein 'T' is an alkylene radical containing 2 to 6 carbon atoms and 'u' is equal to or greater than zero (0) but less than or equal to five (5). Such alkylene polyamines include ethylene diamine, diethylene triamine, triethylene tetramine, tetraethylene pentamine, pentaethylene hexamine, propylene diamine, dibutylene triamine, hexamethylene diamine, and the like.

Other polyamine curing agents that can be employed in the practice of this invention are the polyamido amines, which are reaction products of alkylene polyamines and fatty acids. Such polyamidoamines are well known in the art and are described in U.S. Pat. Nos. 2,705,223, 2,811,495 and 2,899,397, which patents are hereby incorporated by reference. Other polyamine curing agents are the adducts of polyamines and epoxy compounds such as those described in U.S. Pat. Nos. 2,651,589, 2,864,775 and 4,116,900, which patents are hereby incorporated by reference.

Examples of useful curing agents also include epoxy curing agents comprising the reaction product of reactants consisting essentially of:

an alkylene polyamine having less than about 12 carbon atoms (preferably a member selected from the group consisting of lower alkylene diamines and lower polyalkylene polyamines, said member having from 2 to 8 carbon atoms and, more preferably, only straight-chain alkylene groups), an aromatic mono-glycidyl ether having less than about 18 carbon atoms (preferably selected from the group consisting of mono-alkylphenyl glycidyl ethers and di-alkyl phenyl glycidyl ethers having from 9 to 13 carbon atoms), and a diglycidyl ether of an aromatic diol having an average degree of oligomerization of less than about 3.5 (preferably less than about 1.5, and preferably derived from an alkyl bis-phenol, e.g. bisphenol A), wherein:

the ratio of primary amine equivalents of said alkylene polyamine to the total epoxide equivalents of said aromatic glycidyl ether and said diglycidyl ether of an aromatic diol are not less than essentially one, and the ratio of epoxide equivalents of said aromatic mono-glycidyl ether to epoxide equivalents of said diglycidyl ether of an aromatic diol is greater than one (preferably greater than 1.5, more preferably from about 2:1 to about 6:1, and most preferably from about 3:1 to 5:1). In preferred embodiments, the alkylene polyamine is not pro-reacted with the diglycidyl ether of an aromatic diol and, thus, said ratio of epoxide equivalents of said aromatic mono-glycidyl ether to epoxide equivalents of said diglycidyl ether of an aromatic diol is at no time during the entire course of the reaction, less than the final product ratio of epoxide equivalents of said aromatic mono-glycidyl ether to epoxide equivalents of said diglycidyl ether of an aromatic diol. (By "final product ratio" is meant the ratio of all epoxide equivalents of said aromatic mono-glycidyl ether added over the entire course of the reaction to all epoxide equivalents of said diglycidyl ether of an aromatic diol added over the entire course of the reaction.) The maintenance of such a ratio can be accomplished by co-addition of proportionally adjusted amounts of said aromatic mono-glycidyl ether and said diglycidyl ether of an aromatic diol (which will maintain the final product ratio essentially throughout said reaction) or by pro-reacting the mono-glycidyl ether with the alkylene polyamine (which will maintain an even greater ratio than the final product ratio for most of the course of the reaction).

A first group of preferred embodiments within the broad scope set forth above, is wherein the alkylene polyamine is a polyalkylene polyamine and the ratio of primary amine equivalents of said alkylene polyamine to the total epoxide equivalents of said aromatic glycidyl ether and said diglycidyl ether of an aromatic diol is essentially one, i.e. the molar equivalents of primary amine groups of said polyalkylene polyamine is essentially equal to the molar equivalents of glycidyl groups (e.g. a ratio of from about 0.85:1 to about 1.05:1, preferably from about 0.90:1 to about 0.95:1).

A second group of preferred embodiments within the broad scope set forth above, is wherein the alkylene polyamine Is a mono-alkylene polyamine and the ratio of primary amine equivalents of said alkylene polyamine to the total epoxide equivalents of said aromatic glycidyl ether and said diglycidyl ether of an aromatic diol is greater than essentially one, i.e. the molar equivalents of primary amine groups of said polyalkylene polyamine are essentially in excess of the molar equivalents of glycidyl groups (e.g. a ratio of from about 1.05:1 to 2.0:1, preferably from about 1.1:1 to about 1.75:1, more preferably from about 1.2:1 to about 1.5:1 ).

A third group of preferred embodiments is wherein said alkylene polyamine is comprised of a major amount on a molar basis of a mono-alkylene polyamine and a minor amount on a molar basis of a polyalkylene polyamine (preferably in a molar ratio of from about 6:1 to about 2.5:1, more preferably from about 5:1 to about 3:1).

The reaction product is preferably employed as a curing agent for an aqueous epoxy resin in a two component coating system wherein said curing agent, essentially free of adds, is mixed with an aqueous epoxy resin emulsion and then the resulting mixture is applied as a continuous coating to a rigid substrate.

The curing agents of this invention are prepared from three major reaction components. The first component is an alkylene polyamine, the second component is an aromatic glycidyl ether, and the third component is diglycidyl ether of an aromatic diol. The nature of these components will be addressed in turn below.

The alkylene polyamines useful in this invention can be characterized as lower alkylene polyamines and lower polyalkylene polyamines. These materials are commercially available or can be prepared by conventional preparative techniques. These contain at least 2 amine nitrogen atoms per molecule, at least 3 amine hydrogen atoms per molecule and no other groups which are reactive with epoxide. Useful polyamines typically contain about 2 to about 6 amine nitrogen atoms per molecule, 3 to about 8 amine hydrogen atoms, and 2 to about 12 carbon atoms. Mixtures of amines can also be used.

Examples of such amines are the alkylene polyamines ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, 1,7-heptylene diamine, 1,10-decylene diamine, and the like. Preferred amines for use in this invention are polyamines of the formula $H_2N\text{—}R(\text{—}NH\text{—}R)_n\text{—}NH_2$ wherein n is 0 to 4 and R is an alkylene group containing 2 to 8 carbon atoms, provided the total carbon atoms do not exceed 12. Examples of the preferred mono-alkylene polyamines include 1,4-butylene diamine (tetramethylene diamine), 1,6-hexylene diamine (hexamethylene diamine), and 1,8-octylene diamine (octamethylene diamine). The polyalkylene polyamines have at least one secondary amine group. Examples of polyalkylene polyamines include diethylene triamine, triethylene tetramine, tetraethylene pentamine, pentaethylene hexamine, dipropylene triamine, tributylene tetramine, trimethylhexamethylene diamine, hexamethylene triamine and the like. The more preferred polyalkylene polyamines are the polyethylene polyamines with the most preferred being triethylene tetramine and diethylene triamine.

Cyclic diamines can also be included in the diamine component, preferably, however only in minor amounts, e.g. at less than 10%, and preferably less than 5%, of the primary amine equivalents. Examples of cyclic diamines include 1,4-diaminocyclohexane, 1,2-diaminocyclohexane, o, m and p-phenylene diamine, 4,4'-methylene dianiline, meta-xylylene diamine, and isophorone diamine.

In certain embodiments of the invention, the amine component is comprised of a major amount on a molar basis of a mono-alkylene polyamine and a minor amount on a molar basis of a polyalkylene polyamine (preferably in a molar ratio of from about 6:1 to about 2.5:1, more preferably from about 5:1 to about 3:1). It has been found that the use of both a mono-alkylene polyamine and a polyalkylene polyamine has certain advantages over the use of a mono-alkylene polyamine alone. One important advantage is that the polyalkylene polyamine appears to prevent precipitation of the curing agent that can occur upon storage. These epoxy curing agents comprise the reaction product of reactants consisting essentially of an alkylene polyamine having less than about 12 carbon atoms, an aromatic mono-glycidyl ether having less than about 18 carbon atoms, and a diglycidyl ether of an aromatic diol having an average degree of oligomerization of less than about 3.5, wherein the ratio of primary amine equivalents of said alkylene polyamine to the total epoxide equivalents of said aromatic glycidyl ether and said diglycidyl ether of an aromatic diol is not essentially less than one, and the ratio of epoxide equivalents of said aromatic mono-glycidyl ether to epoxide equivalents of said diglycidyl ether of an aromatic diol is greater than one.

In addition to the amine curing agent, a curing accelerator can be included in the coating composition. Such an accelerator will serve to reduce the time for the coating to become tack-free. Useful accelerators for amine curing agents include tertiary amines, e.g. N,N'-bis(dimethylaminopropyl) urea.

Other curing agents can be used in the composition of this invention, particularly when the coatings made from the compositions are heated to effect a cure. Examples of such additional curing agents are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group.

Other epoxy resin curing agents may also be useful, e.g. catalytic curing agents: Lewis bases (such as tertiary amines), Lewis acids (such as boron trifluoride), cationic curing agents (such as aryldiazonium salts, diaryliodinium salts, onium salts of Group Via elements, especially sulfur) and reactive curing agents: mercaptans, isocyanates, carboxylic acids, and acid anhydrides. Curing agents for epoxy resins in general are discussed in the *Encyclopedia Of Polymer Science and Engineering*, vol. 6, pp. 340–361 (John Wiley & Sons, Inc., N.Y., N.Y., 1986), the disclosure of which is incorporated by reference.

The following examples are further illustrative of the present invention. The reactants and other specific ingredients are presented as being typical, and various modifications can be derived in view of the foregoing disclosure within the scope of the invention.

EXAMPLES

EXAMPLE 1

Preparation of Amine-epoxide Adduct (66% Capped)

Into a one liter reaction flask equipped with a stirrer, heating mantle, nitrogen line, cooling condenser, and thermometer is charged 485 grams (0.4 equivalents) Jeffamine 2000. (*Texaco Chemical Company*, Houston, Tex.) and 142.2 grams (0.61 equivalents) of polyepoxide of propoxylated (5PO) pentaerythritol (Henkel Corporation, Ambler, PA). The reaction mixture is heated slowly to 125°–130° C. with stirring and held at this temperature for about 2.5 hours. The reaction mixture is then cooled to 70° C. and analyzed for epoxide and amine content. The product amine polyepoxide adduct has 0.4 meq./gm of total amine and 0.33 meq./gm of epoxide which indicates that about 66% of the initial free epoxide groups have been reacted with the amine.

EXAMPLE 1A

Amine-epoxide adduct (50% capped)

Example 1 was repeated except 75.0 gm (0.063 equivalent) of polyethoxy amine* and 35.5 gm (0.126 equivalent) polyepoxide of propoxylated (5PO) pentaerythritol were reacted. The resulting adduct yielded a product containing 0.34 me*/gm of total amine and 0.54 me/gm of epoxide which represents 50% of the original epoxide moiety capped with the amine.

* TEXACO's Jeffamine M-2070

* me (milliequivalent)

EXAMPLE 1B

Amine-epoxide adduct (75% capped)

Example 1 was repeated except 75 gm (0.063 equivalent) of polyethoxy amine* and 23.6 gm (0.083 equivalent) polyepoxide of propoxylated (5PO) pentaerythritol were reacted. The resulting adduct yielded a product containing 0.4 me/gm of total amine and 0.26 me/gm of epoxide which represents about 75% of the initial epoxide capped with the amine.

* TEXACO's Jeffamine M-2070

EXAMPLE 1C

Amine-epoxide adduct (66% capped)

Example 1 was repeated except 50.0 gm polyethoxy amine* (0.0831 equivalent) and 35.0 gm (0.1245 equivalent) polyepoxide of propoxylated (5PO) pentaerythritol were reacted. The resulting adduct contained 0.61 me/gm of total amine and 0.37 me/gm of epoxide which represents about 66% of the initial epoxide capped with the amine.

* TEXACO's Jeffamine M-1000

EXAMPLE 1D

Example 1 was repeated except 150.0 gm (0.102 equivalent) of polyethoxy amine* and 41.6 gm (0.153 equivalent) polyepoxide of propoxylated (5PO) pentaerythritol were reacted. The resulting adduct contained 0.32 me/gm of total amine and 0.31 me/gm of epoxide which represents about 66% of the initial epoxide capped with the amine.

* TEXACO's Experimental amine No. 6940-29 (MW 3,000)

EXAMPLE 2

Preparation of Self-Dispersing Resin

Into a 250 mL reaction flask equipped with heating mantle, nitrogen line, cooling condenser, thermometer and stirring means is charged 66.4 grams (0.348 equivalents) of the diglycidyl ether of bis-phenol A, and 19.6 grams (0.172 equivalents) of bis-phenol A. The reactants are heated to 95° C. and then 12.0 grams (0.004 equivalents) of the amine-epoxide adduct prepared above (Example 1) is added with 0.15 grams triphenyl phosphine. The reaction mixture is heated slowly to 150° C. with stirring whereupon an exothermic reaction is observed. Cooling is immediately applied to maintain the reaction temperature between 150° C. and 160° C. After the exothermic reaction subsides, the reaction mixture is maintained at 160° C. for an additional hour followed by a 15 minute period at 190° C. The reaction mixture is then cooled to 160° C. and 14 grams of propyl cellosolve is added which immediately begins refluxing. The reaction mixture is cooled to 100° C. and analyzed. The resultant self-dispersing resin, present at 87.5% solids in propyl cellosolve, has 0.07 meq./gm total amine and an epoxide equivalent weight of 552 based on resin solids.

EXAMPLE 2A

Example of a Larger Scale Preparation of Self-Dispersing Resin

Into a 5 l. reaction flask equipped with heating mantle, nitrogen line, cooling condenser, thermometer and stirrer, is charged 1716 grams (8.99 equivalents) of the diglycidyl ether of bis-phenol A, and 506.4 grams (4.44 equivalents) of bis-phenol A. The reactants were heated to 95° C. and then 413.4 grams (0.138 equivalents) of the amine-epoxide adduct prepared according to Example 1 along with 2.1 grams of triphenyl phosphene is added. The reaction mixture is heated carefully to about 150° C. with stirring whereupon an exothermic reaction is noted. Cooling is immediately applied to maintain the temperature between 150° C. and 160° C. After the exotherm subsides, the reaction mixture is maintained at 160° C. for an additional hour followed by a 15 minute period at 190° C. The reaction mixture is then cooled to about 160° C. and 362.1 grams of propyl cellosolve is added. Cooling is continued to about 100° C. when it is sampled and analyzed for epoxide equivalent weight. The resulting self-dispersing resin has an epoxide equivalent weight of 550 based on resin solids.

EXAMPLE 3

Preparation of Water-Borne Dispersion

Into a 500 mL reaction flask equipped with a stirrer, heating mantle, nitrogen line, cooling condenser and thermometer is charged 112 grams of the self-dispersing resin (SDR) prepared according to Example 2. The resin is heated to 100° C. whereupon 16.5 grams water are added gradually with stirring over a thirty minute period while the temperature drops to about 55° C. Then an additional 48 grams of water is added as the temperature is brought to 70° C. over twenty minutes. At 70° C. there is added 2 grams of water, followed by stirring for twenty minutes and then by 3 grams of water. The resulting water in oil dispersion is stirred for 45 minutes while it cools to 45° C., and thereafter is in the form of an oil in water dispersion. After the inversion is complete, 2.0 grams of $C_8$–$C_{10}$ alcohol mono-glycidyl ether from CVC Specialty Chemicals Corp is added as a reactive diluent. Then 36.3 grams water is added at 50° C. over a one hour period. The resulting water-borne dispersion contains 56% resin solids in water/propyl cellosolve (82/18) solvent.

EXAMPLE 3A

Preparation of Water-Borne Dispersion on a Larger Scale

Into a 1 liter reaction flask equipped with a stirrer, heating mantle, nitrogen line, cooling condenser and thermometer is charged 494 grams of the SDR prepared according to example 2A. The resin is heated to 60° C. to 65° C. and 130.3 grams of water is added over one hour. The temperature is then lowered to 50° C. over about 30 minutes whereupon the water in oil emulsion formed inverted to an oil in water emulsion. After inversion is complete, 8.8 grams of $C_8$–$C_{10}$ alcohol mono-glycidyl ether is added. After mixing for 10 minutes, 159.3 grams of water was added at 50° C. over one hour. The resulting water borne dispersion contains 56% resin solids.

EXAMPLE 3B

Example 3 was repeated except the SDR contained the amine epoxide adduct from Example 1A.

EXAMPLE 3C

Example 3 was repeated except the SDR contained the amine epoxide adduct from Example 1B.

EXAMPLE 3D

Example 3 was repeated except the SDR contained the amine epoxide adduct from Example 1C.

EXAMPLE 3E

Example 3 was repeated except the SDR contained the amine epoxide adduct from Example 1D.

EXAMPLE 3F

Example 3 was repeated except the amine-epoxide adduct of Example 1 A was post-added, i.e. added to the reaction product of the diglycidyl ether of Bis-phenol A and Bis-phenol A.

EXAMPLE 3G

Example 3 was repeated except the amine-epoxide adduct from Example 1B was post-added after the reaction of the diglycidyl ether of Bis-phenol A and Bis-phenol A.

The properties of these dispersions are given in the following table:

| PROPERTIES OF DISPERSIONS | | | | |
|---|---|---|---|---|
| Dispersion | Viscosity CPS/25° C. | Stability at 50°/4 weeks | Particle Size (Microns) | Film |
| 3 | 250 | S | 1.4 | P |
| 3B | 900 | U | 3.2 | P |
| 3C | 850 | S | 2.0 | P |
| 3D | 800 | S | 1.2 | P |
| 3E | 850 | S | 1.6 | P |
| 3F | 100 | U | 4.0 | P |
| 3G | 200 | U | 3.7 | P |

Note:
1. In the above table, P = Passed, S = Stable, and U = Unstable.
2. 3B produced an unstable dispersion and large particle size because the amine-epoxy adduct at 50% capping was ineffective. 3F and 3G produced unstable dispersions and large particle size because the amine-epoxy adduct was post added to the resin. Film properties were acceptable for the dispersions tested.

EXAMPLE 4

Preparation of Coating Composition

Into a 25 mL plastic cup is charged 12.4 gm (56% solids) of the water-borne dispersion prepared according to Example 3 followed by an equal equivalent amount (2 gm) of epoxy curing agent available as 8290 by HiTech (a modified diethylene triamine with a hydrogen equivalent weight of 163). Sufficient water is then added to bring the mixture to a spreadable consistency. The epoxy dispersion/curing agent blend is aged for 10 minutes then a film casting is produced by drawing the blend down on pre-sanded TRU COLD cold rolled steel panel (3×6×0.32 inches) using a #34 wire wound steel rod. The film was tack free after 45 minutes. The physical properties of the coating composition were measured after the film had air dried at room temperature for 28 days.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. An amine-epoxy adduct useful in the preparation of a self-dispersing curable epoxy resin, the adduct comprising the addition product of reactants comprising an aliphatic polyepoxide and from 0.3 to 0.9 reactive equivalents of a polyoxyalkyleneamine per reactive equivalent of said aliphatic polyepoxide, said polyoxyalkyleneamine having the structural formula:

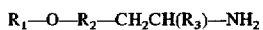

$R_1—O—R_2—CH_2CH(R_3)—NH_2$ wherein:

$R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

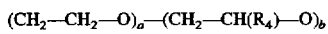

$(CH_2—CH_2—O)_a—(CH_2—CH(R_4)—O)_b$ wherein:

$R_4$ is a monovalent organic radical selected from the group consisting of $C_1$ to $C_4$ aliphatic hydrocarbons, 'a' designates a number of ethoxy groups $(CH_2—CH_2—O)$, 'b' designates a number of monosubstituted ethoxy groups $(CH_2—CH(R_4)—O)$ where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

2. An amine-epoxy adduct as claimed in claim 1 wherein said polyoxyalkyleneamine has $R_1$, $R_3$ and $R_4$ each equal to methyl, and (i) a ratio of 'a' and 'b' of about 4:1, wherein the ethoxy and iso-propoxy groups are arranged in random blocks and the molecular weight of the polyoxyalkyleneamine is less than about 4,000, or (ii) a block of 5 ethoxy groups joined to a random sequence of ethoxy and iso-propoxy groups wherein the ratio of 'a' and 'b' in the random sequence is about 7:3 and the molecular weight of the polyoxyalkyleneamine is less than about 4,000, or (iii) a ratio of 'a' and 'b' of about 95:5, wherein the ethoxy and iso-propoxy groups are arranged substantially in two blocks and the molecular weight of the polyoxyalkyleneamine is less than about 6,000, or (iv) a ratio of 'a' and 'b' of about 7:3, wherein the ethoxy and iso-propoxy groups are present in random sequence and the molecular weight of the polyoxyalkyleneamine is less than about 4,000, or (v) a ratio of 'a' and 'b' of about 4:1, wherein the ethoxy and iso-propoxy groups are present in random sequence and the molecular weight of the polyoxyalkyleneamine is less than about 4,000.

3. An amine-epoxy adduct as claimed in claim 1 wherein said polyoxyalkyleneamine is prepared by reacting methanol with ethylene oxide and propylene oxide followed by conversion of the resulting terminal hydroxyl group to an amine, said polyoxyalkyleneamine has an approximate molecular weight of 2,000 and a mole ratio of propylene oxide to ethylene oxide of 10/32.

4. An amine-epoxy adduct as claimed in claim 1 wherein said aliphatic polyepoxide has the structural formula:

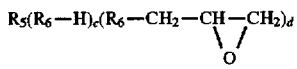

$R_5(R_6—H)_c(R_6—CH_2—CH—CH_2)_d$
$\phantom{R_5(R_6—H)_c(R_6—CH_2—C}\backslash\phantom{H}/$
$\phantom{R_5(R_6—H)_c(R_6—CH_2—CH}O$ wherein $R_5$ designates a linear, branched or cyclic aliphatic or alicyclic organic radical having a valency equal to the sum of 'c' and 'd', where the sum of 'c' and 'd' is equal to or greater than 2 but no more than 6 and where 'd' is equal to or greater than 2 but less than or equal to 6, and $R_6$ represents a divalent polyoxyalkylene chain having the structural formula:

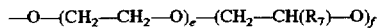

$—O—(CH_2—CH_2—O)_e—(CH_2—CH(R_7)—O)_f$ wherein $R_7$ is a monovalent organic radical selected from the group consisting of $C_1$ to $C_4$ aliphatic hydrocarbons, and the sum of 'e' and 'f' is greater than 0 but less than or equal to 10.

5. An amine-epoxy adduct as claimed in claim 4 wherein $R_5$ is selected from the group consisting of linear, branched or cyclic aliphatic or alicyclic trivalent organic radicals having from 3 to 14 carbon atoms, linear, branched or cyclic aliphatic or alicyclic tetravalent organic radicals having from 5 to 30 carbon atoms, linear, branched or cyclic aliphatic or alicyclic pentavalent organic radicals having from 6 to 30 carbon atoms, linear, branched or cyclic aliphatic or alicyclic hexavalent organic radicals having from 8 to 30 carbon atoms.

6. An amine-epoxy adduct as claimed in claim 4 wherein $R_5$ is selected from the group consisting of linear, branched or cyclic aliphatic or alicyclic tetravalent organic radicals having from 5 to 30 carbon atoms.

7. An amine-epoxy adduct as claimed in claim 4 wherein $R_5$ is the hydrocarbon portion of the tetrahydric alcohol pentaerythritol which remains after the hydroxyl groups have been removed.

8. An amine-epoxy adduct as claimed in claim 1 wherein said aliphatic polyepoxide is the reaction product of epichlorohydrin and a propoxylated pentaerythritol, having an epoxide equivalent weight of about 230.

9. An amine-epoxy adduct as claimed in claim 1 wherein the amount of said polyoxyalkyleneamine per reactive equivalent of said aliphatic polyepoxide is from about 0.6 to 0.8.

10. An amine-epoxy adduct useful in the preparation of a self-dispersing curable epoxy resin, the adduct comprising the addition product of reactants comprising an aliphatic polyepoxide and from about 0.6 to 0.8 reactive equivalents of a polyoxyalkyleneamine per reactive equivalent of said aliphatic polyepoxide, said aliphatic polyepoxide having, the structural formula:

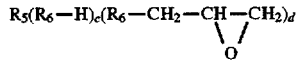

$R_5(R_6—H)_c(R_6—CH_2—CH—CH_2)_d$
$\phantom{R_5(R_6—H)_c(R_6—CH_2—C}\backslash\phantom{H}/$
$\phantom{R_5(R_6—H)_c(R_6—CH_2—CH}O$ wherein $R_5$ is selected from the group consisting of linear, branched or cyclic aliphatic or alicyclic trivalent organic radicals having from 3 to 14 carbon atoms, linear, branched or cyclic aliphatic or alicyclic tetravalent organic radicals having from 5 to 30 carbon atoms, linear, branched or cyclic aliphatic or alicyclic pentavalent organic radicals having from 6 to 30 carbon atoms, linear, branched or cyclic aliphatic or alicyclic hexavalent organic radicals having from 8 to 30 carbon atom, and $R_6$ represents a divalent polyoxyalkylene chain having the structural formula:

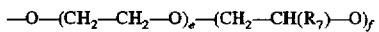

wherein $R_7$ is a monovalent organic radical selected from the group consisting of $C_1$ to $C_4$ aliphatic hydrocarbons, and the sum of 'e' and 'f' is greater than 0 but less than or equal to 10, and said polyoxyalkyleneamine having the structural formula:

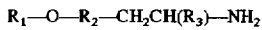

wherein:

$R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

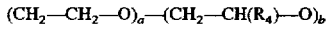

wherein:

$R_4$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_4)$—O) where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

11. A composition as claimed in claim 10 wherein said aliphatic polyepoxide is the reaction product of epichlorohydrin and a propoxylated pentaerythritol, having an epoxide equivalent weight of about 230.

12. An amine-epoxy adduct as claimed in claim 11 wherein said polyoxyalkyleneamine is prepared by reacting methanol with ethylene oxide and propylene oxide followed by conversion of the resulting terminal hydroxyl group to an amine, said polyoxyalkyleneamine has an approximate molecular weight of 2,000 and a mole ratio of propylene oxide to ethylene oxide of 10/32.

13. An amine-epoxy adduct according to claim 1 wherein said adduct is prepared by the process of reacting 1.0 equivalent of an aliphatic polyepoxide and from about 0.3 to 0.9 reactive equivalents of a polyoxyalkyleneamine.

* * * * *

UNITED STATES PATENT AND TRADEMARK OFFICE
CERTIFICATE OF CORRECTION

PATENT NO. : 5,652,323

DATED : July 29, 1997

INVENTOR(S) : John G. Papalos; Reuben H. Grinstein; Shailesh Shah; Joseph L. Mulvey; Brian G. Jewell It is certified that error appears in the above-identified patent and that said Letters Patent is hereby corrected as shown below:

In column 6, line 40 delete "$R_g$" and insert therefor --$R_9$--

In column 11, line 26, delete "pro-" and insert therefor --pre---

In column 11, line 62, delete "adds" and insert therefor --acids--

In column 13, line 38, delete "Group Via" and insert therefor --Group VIa--

Signed and Sealed this

Sixteenth Day of November, 1999

Attest:

Q. TODD DICKINSON

*Attesting Officer*    *Acting Commissioner of Patents and Trademarks*